United States Patent
Lee et al.

(10) Patent No.: US 8,761,025 B2
(45) Date of Patent: Jun. 24, 2014

(54) METHOD FOR TESTING THE COMMUNICATION PERFORMANCE OF A PLURALITY OF WIRELESS SIGNAL ACCESS DEVICES

(75) Inventors: Chien-Lung Lee, Zhubei (TW); Yi-Ming Wang, Zhubei (TW); Chih-Hsien Shen, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 176 days.

(21) Appl. No.: 13/428,139

(22) Filed: Mar. 23, 2012

(65) Prior Publication Data
US 2012/0243419 A1    Sep. 27, 2012

(30) Foreign Application Priority Data
Mar. 25, 2011    (TW) .............................. 100110402 A

(51) Int. Cl.
*H04J 1/16* (2006.01)
*H04W 24/06* (2009.01)
(52) U.S. Cl.
CPC ...................................... *H04W 24/06* (2013.01)
USPC .......................................... 370/241; 370/338

(58) Field of Classification Search
CPC ...................................................... H04W 24/00
USPC .......................................... 370/241–252, 338
See application file for complete search history.

(56) References Cited

U.S. PATENT DOCUMENTS

| | | | |
|---|---|---|---|
| 2003/0095577 A1* | 5/2003 | Horiuchi et al. | 370/542 |
| 2007/0072599 A1* | 3/2007 | Romine et al. | 455/423 |
| 2008/0130507 A1* | 6/2008 | Kwon | 370/241 |

* cited by examiner

*Primary Examiner* — Kan Yuen
(74) *Attorney, Agent, or Firm* — Chun-Ming Shih

(57) ABSTRACT

A method used for testing the communication performance of a plurality of wireless signal access devices, and the steps of the testing method of each wireless signal access device include: (a). booting up the wireless signal access device; (b). activating said the wireless signal access device to transmit or receive testing packets to test the communication performance of the wireless signal access device. The feature of the present invention lies in completing a step a of the next wireless signal access device before completing a step b of a first wireless signal access device, and starting the step b of the next wireless signal access device in an appropriate timing after completing the step b of the first wireless signal access device, thereby reaching the goal of reducing the test time.

18 Claims, 4 Drawing Sheets

METHOD FOR TESTING THE COMMUNICATION PERFORMANCE OF A PLURALITY OF WIRELESS SIGNAL ACCESS DEVICES

BACKGROUND

1. Technical Field

The present invention relates to wireless communication, more specifically, relates to a method used for testing the communication performance of a plurality of wireless signal access devices.

2. Related Art

Recently, with the advance of the technology, the wireless access point, wireless AP, gateway, wireless router, or other wireless signal access devices having the function of wireless communication are popular and easy to be acquired nowadays. Those wireless signal access devices mentioned above will be tested to make sure the communication performance before being put to the market.

The conventional method for testing the communication performance of the wireless signal access device is to accommodate the wireless signal access device into an electric wave isolation absorption chamber, and further doing the steps as follows:

(a) Loading test data;
(b) booting up the wireless signal access device; and
(c) after successfully booting up the device, the wireless signal access device starts to transmit the test data to test the communication performance of the wireless signal access device.

Due to the high cost of the electric wave isolation absorption chamber, users usually test a plurality of the wireless signal access devices in the same electric wave isolation absorption chamber. In order to avoid the interference of the same channel, the test steps (a)-(c) of the second device will not begin until all the test steps (a)-(c) of the first device are completed. By way of this, it should take too much time to complete the test of all the wireless signal access devices, which also increases the cost of the test. Thus, the conventional method for testing the communication performance of the wireless signal access device is not perfect, and further improvement will be needed.

BRIEF SUMMARY

The present invention provides a method for testing the communication performance of a plurality of wireless signal access devices, which can substantially shorten the test time.

The method for testing the communication performance of a plurality of wireless signal access devices of the present invention comprises the following steps:

a. booting up the wireless signal access device;
b. activating said the wireless signal access device to transmit or receive testing packets to test the communication performance of the wireless signal access device; wherein The feature of the present invention lies in completing a step a of the next wireless signal access device before completing a step b of a first wireless signal access device, starting the step b of the next wireless signal access device after completing the step b of the first wireless signal access device, thereby reaching the goal of reducing the test time.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
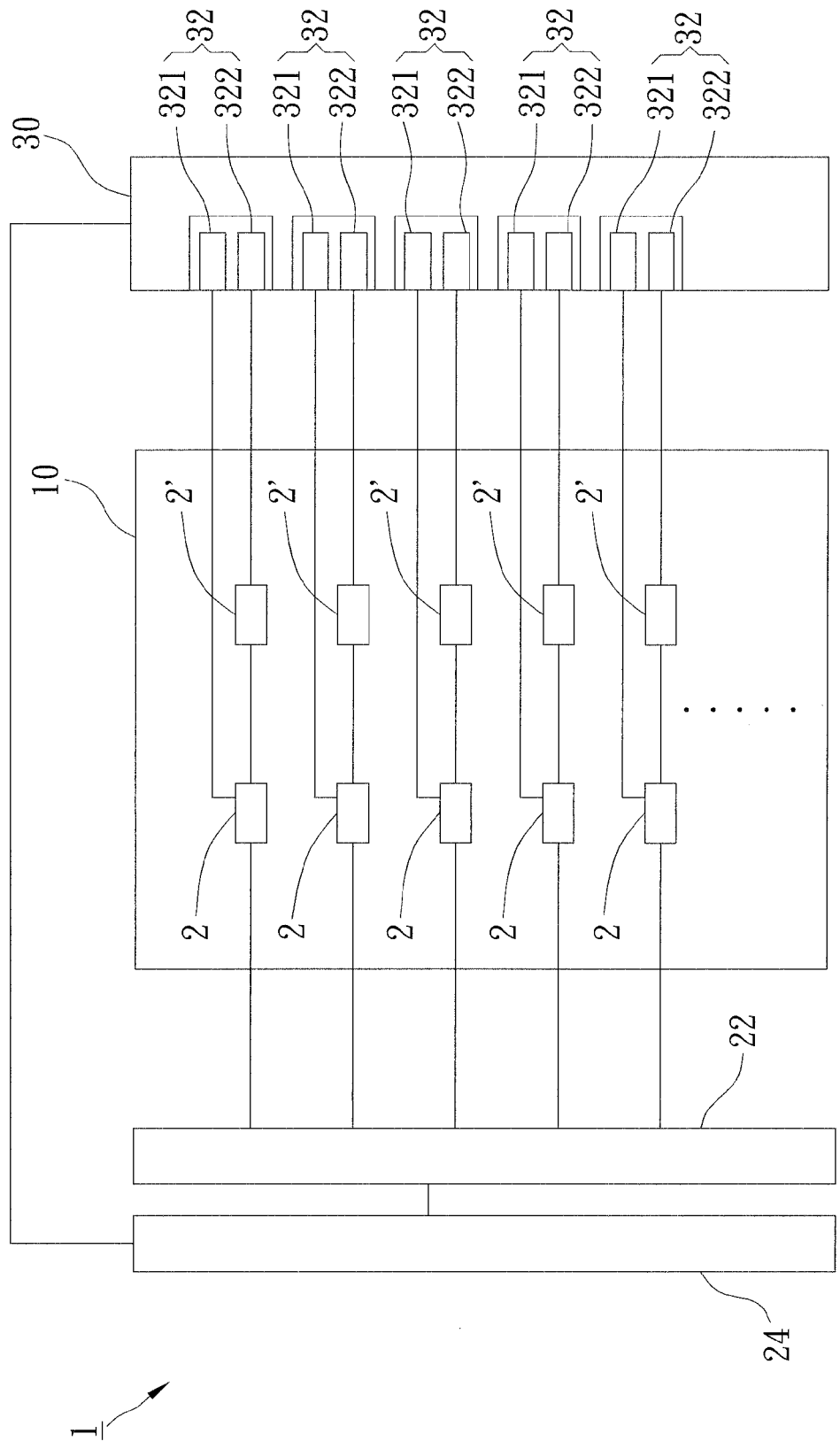
FIG. 1 is a schematic block diagram of the testing system in accordance with the present invention.

Please refer to FIG. 1, which is a testing system 1 used for the testing method of this embodiment of the present invention. The testing system 1 used to measure the data transmission rate, signal strength, or to test other communication performances of the wireless signal access device 2. The testing system 1 includes an electric wave isolation absorption chamber 10, a communication interface 22, a control device 24, and a test device 30. The electric wave isolation absorption chamber 10 is used to accommodate the wireless signal access devices 2 to thereby avoid the interference of the external electric wave.

In the present embodiment, the communication interface 22 is, but not limited to, a multi-port RS-232 interface, which electrically connects the wireless signal access devices 2. Via the communication interface 22, the control device 24 sets up the transmission channels of the wireless signal access devices 2, and starts testing the wireless signal access devices 2.

The test device 30 is connected to the control device 24 and is used to generate the packet transmitted to the wireless signal access devices 2. In present embodiment, the test device 30 is a packet generator. The test device 30 is provided with a plurality of test port sets 32. Each test port set 32 includes a first port 321 and a second port 322, which are connected to the wireless signal access devices 2 respectively. When one of the wireless signal access devices 2 is activated by the control device 24, the corresponding test port set 32 can output the generated test packets to the wireless signal access device 2, or receive packets outputted from the wireless signal access device 2, thereby testing the throughput, transmission rate, signal strength, or other communication performances of the wireless signal access device 2.

The wireless signal access devices 2 are accommodated in the electric wave isolation absorption chamber 10 before the beginning of the test process. The wireless signal access devices 2 connect to the first ports 321 of the test port sets 32 of the test device 30 respectively, and are configured as bridge mode or client mode, which makes the wireless signal access devices 2 being able to connect well functioning wireless signal access devices 2'. The wireless signal access devices 2' connect the second ports 322 of the test port sets 32 of the test device 30, respectively. The steps of testing each wireless signal access device 2 comprise:

a. Booting up the wireless signal access devices 2;
b. activating the interconnected wireless signal access device 2 and 2' to transmit or receive test packets generated from the test device 30, thereby the communication performance of each wireless signal access device can be tested by test device 30.

In detail, when the test begin, the test device 30 begin to generate the test packets after receiving the test starting signal outputted from the control device 24. The test packets are transmitted to the wireless signal access device 2 via the first port 321. The wireless signal access device 2 does the wireless communication with the wireless signal access device 2' with a preset channel, and the test packets are transmitted to the wireless signal access device 2', which further transmit the received test packets to the second port 322. After a predetermined period, the test device 30 receives the stop signal outputted from the control device 24, so that the test device 30 stop generating the test packets. Afterward, the throughput will be obtained by a calculation based on information obtained from above test process and be transmitted to the control device 24. The control device 24 will determines if the wireless signal access device 2 conforms the prospective communication performance.

Figure 2:
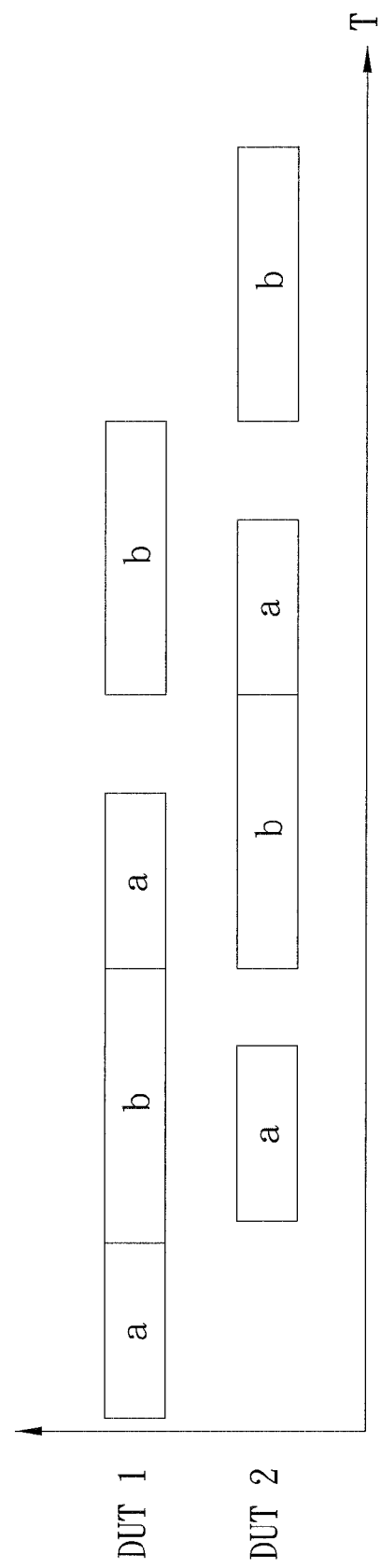
FIG. 2 is a scheduling diagram of the preferred embodiment in accordance with the present invention.

The test scheduling of the present embodiment as shown in FIG. 2, the step a of the wireless signal access device 2 (DUT2) should be completed before the step b of the wireless signal access device 2 (DUT1), and the step b of the wireless signal access device 2 (DUT2) starts after completing the step b of the wireless signal access device 2(DUT1). In present embodiment, the control device 24 will activate the step a of the wireless signal access device 2(DUT2) and the step b of the wireless signal access device 2 (DUT1) after the step a of the wireless signal access device 2(DUT1) is completed, and the step b of the wireless signal access device 2(DUT1) and the step a of the wireless signal access device 2 (DUT2) will be activated by control device 24 once the step b of the wireless signal access device 2(DUT2) is completed.

In addition, when there are three or more than three wireless signal access devices 2 being tested in the same channel, the step a of the second wireless signal access device 2 should be completed before completing the step b of the first wireless signal access device 2, thereby achieving the goal of continuously executing the step b in sequence of the wireless signal access devices 2.

By the way mentioned above, the time wasted on step a of other wireless signal access devices 2 except the first wireless signal access device can be saved. In addition, since the frame forwarding is only performed between the data link layers, the signal processing speed can be increased, and the purpose of reducing the test time can be achieved as well.

Figure 3:
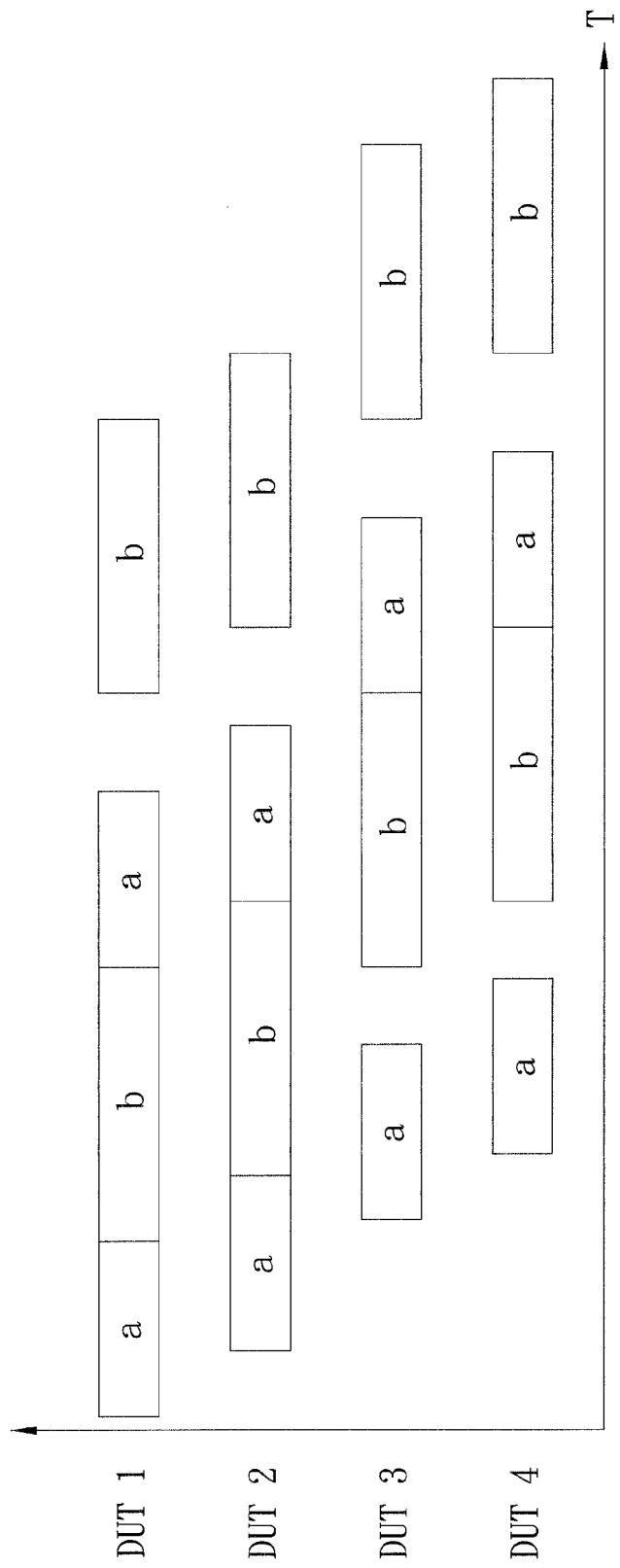
FIG. 3 is a scheduling diagram showing the sorting test of the preferred embodiment in accordance with the present invention.
Figure 4:
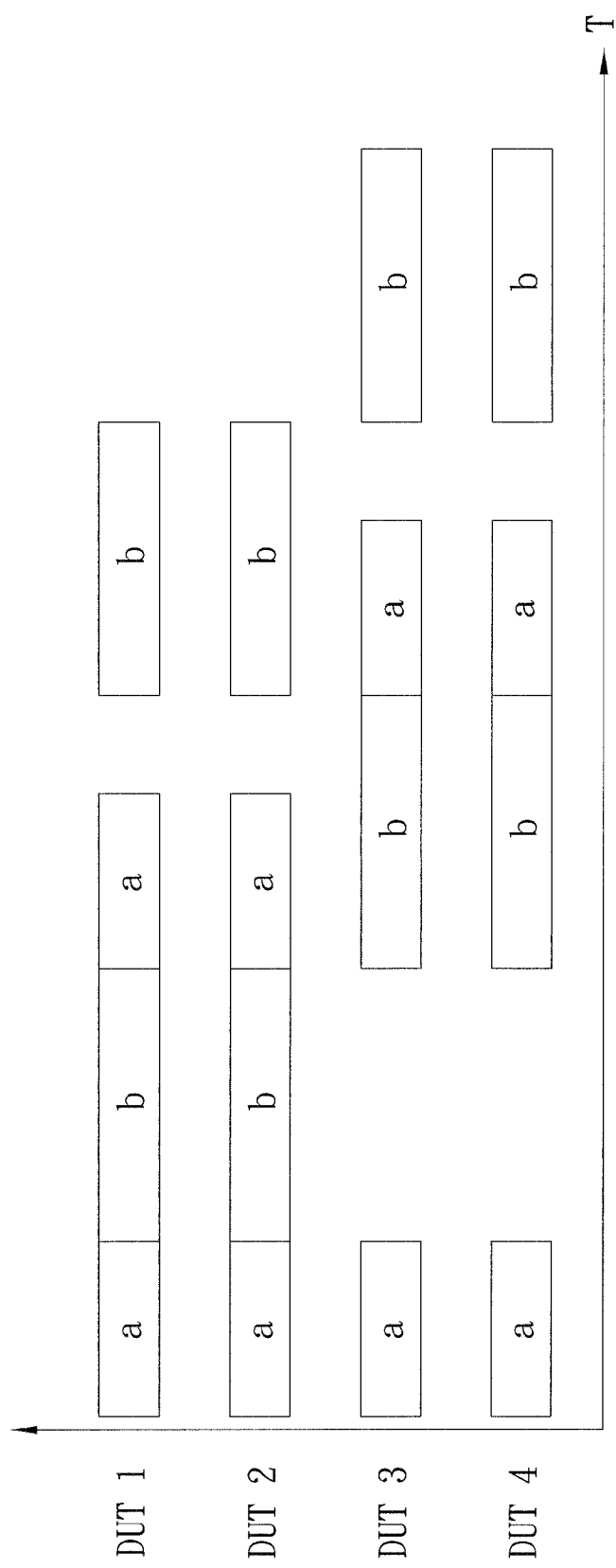
FIG. 4 is another scheduling diagram showing the sorting test of the preferred embodiment in accordance with the present invention.

When there are three or more than three wireless signal access devices to be tested, in order to reduce the time of testing, the wireless signal access devices 2 can transmit or receive the test packets at the same time via a first and a second channel which do not interfere with each other. In the present embodiment, the first channel is channel 1 of IEEE 802.11n, and the second channel is channel 7 of IEEE 802.11n, but the numbers of the channel used and the type of communication protocol are not limited to the above. The channel 1, 6, or 11 of IEEE 802.11g, or channels of other communication protocols not interfering each other can also be used in the embodiment of present invention. Pleas refer to FIG. 3, manually setting up the channels used in each wireless signal access device 2 before executing the step a, and activating each wireless signal access device 2 sequentially. However, the channels used in each wireless signal access device 2 can also be set up prior to executing the step b if not influencing the execution of the step b.

Because the wireless signal access devices 2 (DUT 1, 3) using the first channel does not interfere with the wireless signal access devices 2 (DUT 2, 4) using the second channel, the wireless signal access devices 2 (DUT1, 3) can execute the step b with the wireless signal access devices 2 (DUT 2, 4) at the same time, thereby achieving the goal of testing a plurality of devices at the same time.

Except manually activating the wireless signal access devices 2 sequentially, the wireless signal access devices 2 can also be activated simultaneously by the computer program, and further using the way of scheduling to stagger the wireless signal access devices 2 which use the same channel to execute the step b, thereby reaching the purpose of the present invention.

Besides, in order to reduce the test time, two wireless signal access devices 2 can also be connected to each other in bridge mode or client mode, and the two wireless signal access devices 2 can transfer the test packets to each other, which makes it possible to test the communication performance of two wireless signal access devices 2 in the same channel at the same time. As such, by applying the test method shown in FIG. 2, the test time can substantially be reduced.

The test method mentioned above can not only be used in testing the communication performance of the wireless signal access device, but also the wireless router or other devices having the function of wireless communication.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A method for testing the communication performance of a plurality of wireless signal access devices, wherein the steps of the testing method of each wireless signal access device comprising:
 a. booting up the wireless signal access device;
 b. activating the wireless signal access device to transmit or receive testing packets to test the communication performance of the wireless signal access device; and
 c. completing a step a of the next wireless signal access device before completing a step b of a first wireless signal access device, starting the step b of the next wireless signal access device after completing the step b of the first wireless signal access device,
 wherein when at least three wireless signal access devices are tested, two of the wireless signal access devices are set to use a first channel to execute the step b, and the other wireless signal access device is set to use a second channel which does not interfere the first channel, to execute the step b, and the wireless signal access devices tested in the first channel or the second channel can execute the step b simultaneously.

2. The method according to claim 1, wherein there are four wireless signal access devices are tested, two of the four wireless signal access devices are set to use the first channel to execute the step b, and the other two of the four wireless signal access devices are set to use the second channel which does not interfere the first channel, to execute the step b, and the four wireless signal access devices tested in the first channel or the second channel can execute the step b simultaneously.

3. The method according to claim 2, wherein each wireless signal access device is set to a channel before executing the step a.

4. The method according to claim 2, wherein each wireless signal access device is set to a channel before executing the step b.

5. The method according to claim 2, wherein two of the four wireless signal access devices use a channel 1 of the IEEE 802.11n to execute the step b, and the other two of the four wireless signal access devices use a channel 7 of the IEEE.802.11n to execute the step b.

6. The method according to claim 1, wherein each wireless signal access device is set to a channel before executing the step a.

7. The method according to claim 1, wherein each wireless signal access device is set to a channel before executing the step b.

8. The method according to claim 1, wherein two of the wireless signal access devices use a channel 1 of the IEEE 802.11n to execute the step b, and the other wireless signal access device uses a channel 7 of the IEEE.802.11n to execute the step b.

9. The method according to claim 1, wherein each wireless signal access device deliver or receive the testing packets in a way of frame relay.

10. A method for testing the communication performance of a plurality of wireless signal access devices, wherein the steps of the testing method of each wireless signal access device comprising:
   a. booting up on the wireless signal access device;
   b. activating the wireless signal access device to transmit or receive testing packets with a same channel of IEEE 802.11 to test the communication performance; and
   c. completing a step a of the next wireless signal access device before completing a step b of a first wireless signal access device, starting the step b of the next wireless signal access device after completing the step b of the first wireless signal access device,
   wherein when at least three wireless signal access devices are tested, two of the wireless signal access devices are set to use a channel of the IEEE 802.11n to execute the step b, and the other wireless signal access device is set to use another channel of the IEEE 802.11n which does not interfere said channel, to execute the step b, and the wireless signal access devices tested in one of the channel of the IEEE 802.11n or another channel of the IEEE 802.11n can execute the step b simultaneously.

11. The method according to claim 10, wherein there are four wireless signal access devices are tested, two of the four wireless signal access devices are set to use one of the channel of IEEE 802.11n to execute the step b, and the other two of the four wireless signal access devices are set to use another channel of the IEEE 802.11n which does not interfere said channel, to execute the step b, and the four wireless signal access devices tested in one of the channel of IEEE 802.11n or another channel of IEEE 802.11n can execute the step b simultaneously.

12. The method according to claim 11, wherein each wireless signal access device is set to a channel of IEEE 802.11n before executing the step a.

13. The method according to claim 11, wherein each wireless signal access device is set to a channel of IEEE 802.11n before executing the step b.

14. The method according to claim 11, wherein two of the four wireless signal access devices use a channel 1 of the IEEE 802.11n to execute the step b, and the other two of the four wireless signal access devices use a channel 7 of the IEEE.802.11n to execute the step b.

15. The method according to claim 10, wherein each wireless signal access device is set to a channel of IEEE 802.11n before executing the step a.

16. The method according to claim 10, wherein each wireless signal access device is set to a channel of IEEE 802.11n before executing the step b.

17. The method according to claim 10, wherein two of the wireless signal access devices use a channel 1 of the IEEE 802.11n to execute the step b, and the other wireless signal access device uses a channel 7 of the IEEE.802.11n to execute the step b.

18. The method according to claim 10, wherein each wireless signal access device deliver or receive the testing packets in a way of frame relay.

* * * * *